(12) United States Patent
Velasco Garcia

(10) Patent No.: US 11,731,916 B2
(45) Date of Patent: Aug. 22, 2023

(54) COMPOSITION FOR PLANTS' ROOT DEVELOPMENT AND GROWING BAG COMPRISING IT

(71) Applicant: PLANT BAG S.L., Alhama de Murcia (ES)

(72) Inventor: Gregorio Velasco Garcia, Alhama de Murcia (ES)

(73) Assignee: PLANT BAG S.L., Alhama de Murcia (ES)

( * ) Notice: Subject to any disclaimer, the term of this patent is extended or adjusted under 35 U.S.C. 154(b) by 44 days.

(21) Appl. No.: 17/418,733

(22) PCT Filed: Jan. 2, 2020

(86) PCT No.: PCT/IB2020/000023
§ 371 (c)(1),
(2) Date: Jun. 25, 2021

(87) PCT Pub. No.: WO2020/141461
PCT Pub. Date: Jul. 9, 2020

(65) Prior Publication Data
US 2022/0073437 A1 Mar. 10, 2022

(30) Foreign Application Priority Data
Jan. 4, 2019 (EP) .................................... 19382005

(51) Int. Cl.
*C05F 3/00* (2006.01)
*A01G 24/25* (2018.01)
*A01G 24/50* (2018.01)

(52) U.S. Cl.
CPC ................ *C05F 3/00* (2013.01); *A01G 24/25* (2018.02); *A01G 24/50* (2018.02)

(58) Field of Classification Search
CPC ........... C05F 3/00; A01G 24/25; A01G 24/50; A01G 24/00
See application file for complete search history.

(56) References Cited

U.S. PATENT DOCUMENTS

2013/0160361 A1 6/2013 Keithly
2018/0168167 A1 6/2018 Juarez et al.

FOREIGN PATENT DOCUMENTS

| CN | 107417449 A | 12/2017 |
| JP | 2008253242 A | * 10/2008 |
| WO | 2018117980 A1 | 6/2018 |

OTHER PUBLICATIONS

F. Fernandez Martin, et al.; Application of arbuscular mycorrhizae glomus iranicum var. tenuihypharum var. nova in intensive agriculture: a study case; Journal of Agricultural Science and Technology B; vol. 7; No. 4; Apr. 28, 2017; XP055520245; pp. 221-247.

(Continued)

*Primary Examiner* — Kent L Bell
(74) *Attorney, Agent, or Firm* — Lucas & Mercanti, LLP

(57) ABSTRACT

The composition contains, as essential components, coconut fibers, compost of sheep manure and *Glomus iranicum* var. *tenuihypahrum*. The composition is included into a bag that has at least two parts joined together through at least a first weakened portion, allowing to separate it into two bags each having an opening wherein the composition contained in the bag parts is accessible. The composition inside each of the bags is contacted with a plant or at least a seed via the opening.

20 Claims, 3 Drawing Sheets

(56) References Cited

OTHER PUBLICATIONS

International Search Report and Written Opinion for PCT/IB2020/000023 dated Jul. 17, 2020; 3 pages in English.

* cited by examiner

COMPOSITION FOR PLANTS' ROOT DEVELOPMENT AND GROWING BAG COMPRISING IT

CROSS REFERENCE TO RELATED APPLICATION

This Application is a 371 of PCT/IB2020/000023 filed on Jan. 2, 2020, which claims priority of European Patent Application No. 19382005.7 filed Jan. 4, 2019, both of which are incorporated herein by reference.

FIELD OF THE INVENTION

The present invention relates to the field of agriculture. In particular, the present invention is related to a composition for plants' root development, a bag comprising it, its use and processes for fast root development of a plant.

BACKGROUND OF THE INVENTION

In the last decades, with the increase in population, an increase in crop productivity has been needed in order to meet the increasing market needs satisfy. A high productivity in crops usually requires fertile soil and optimum climate, rather than a sufficient quantity of water. Different cultivation techniques are usually implemented to make the soil more fertile in order to allow the growth of plants and the establishment of plantations. Among the cultivation techniques, the use of fertilizers has had great success in the increment of soil fertility.

Among the many agronomical factors, fertilizers including a substrate, i.e., a growing medium in which the plant develops its root system, are known in the art. Peat is commonly used substrate for the production of plants and fruits. Peat soils are highly complex porous media with a structure consisting of pores that are open and connected or isolated.

However, there are different disadvantages of using peat. A first disadvantage of peat is due to its natural decomposing structure that makes it acid. As a consequence, the treatment with peat requires the additional use of additives to correct the soil pH. This implies additional costs for control activities, such as soil's pH level monitoring and repeated adjustments thereof, which are periodically required. The soil itself can suffer from the use of many additives. Moreover, peat is an expensive choice for soil.

Additionally, nutrient ratio in peat is often unknown and the overall percentage of nutrients in peat is generally lower than that in other types of fertilizers, such as chemical fertilizers.

Chemical fertilizers generally include inorganic or organic materials of synthetic origin, and are added to soil to sustain plant growth. Examples of chemical fertilizers are ammonium sulfate, ammonium phosphate, ammonium nitrate, urea, ammonium chloride. However, long-term use of chemical fertilizer can change the soil pH, damage the microbial ecosystems, and eventually enter into fruits and vegetables.

Moreover, known fertilizers generally acts slowly, so that long time is required for plant growing and development.

In addition to several types of fertilizers, many cultivation techniques are known in the art.

Generally, plants are placed directly in the soil. Thus, the use of several working tools is required. Specific working tools are necessary also for the application of fertilizers which, however, cannot be evenly distributed on and within the soil through the known application techniques.

Also, it is known that plants can be grown in containers, such as, for example, pots and bags. However, such containers generally need to be filled with soil and/or other substrates; thus, long working times are required.

SUMMARY OF THE INVENTION

It is an aim of the present invention to solve the above mentioned problems and to provide a composition which allows the effective, fast and safe root development and growth of a plant.

A further aim of the present invention is to provide a composition which allows to save water during plant cultivation.

Also aim of the present invention is to provide a composition which allows for a high nutrient supply to a plant.

Still further aim of the present invention is to provide a composition which provides for an increase in plant production.

Another aim of the present invention is to provide a bag comprising said composition, which can be easily handled.

Still another aim of the present invention is to provide processes for fast, safe and effective root development of a plant.

These and other aims are achieved by the present invention, which relates to a composition according to claim 1, to a bag according to claim 5, comprising said composition, and to a process for root development according to claim 7. The present invention also relates to the use of the composition, according to claim 13.

DETAILED DESCRIPTION OF THE INVENTION

Figure 1:
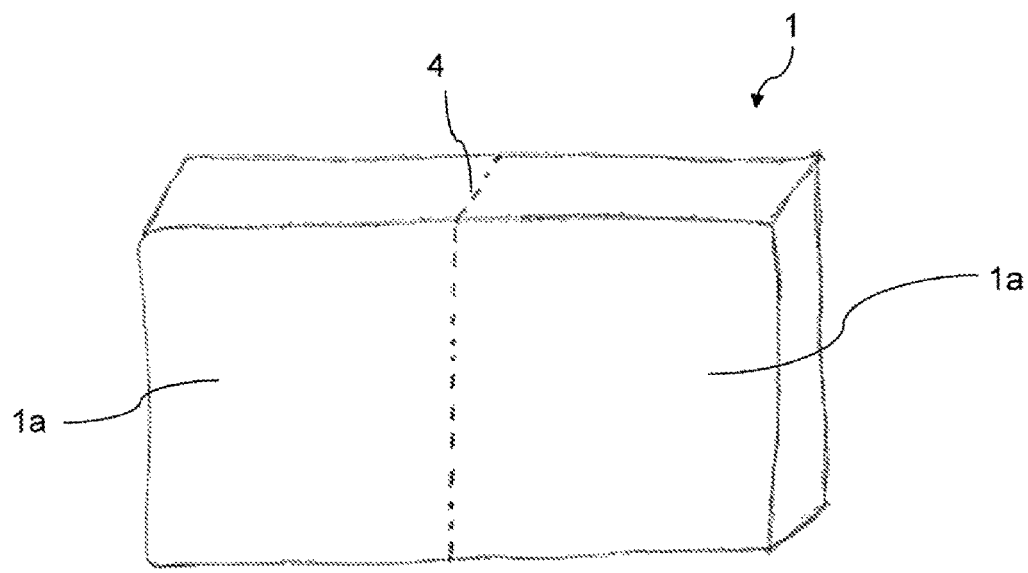
FIG. 1 is a schematic representation of an embodiment of the bag of the invention.

Object of the present invention is a composition comprising coconut fibers, compost of sheep manure and *Glomus iranicum* var. *tenuihypahrum*, an arbuscular mycorrhizal fungus (AMF) that helps improve the physiochemical conditions of the soil and stimulates growth and productivity of the majority of plants It has been surprisingly observed that the composition of the invention provides a particularly suitable amount of nutrients for the root development of plants. Advantageously, the composition of the invention allows to achieve a fast root development, thus obtaining a high plant productivity in a relatively short time, with respect to the known compositions and fertilizers.

Another advantage of the composition of the invention is that a reduced amount of water, as well as a reduced frequency of irrigation, with respect to the known compositions and fertilizers, is required for plant growing and root development.

According to an aspect of the invention, the composition acts as a substrate for the growing of plants.

As used herein, the term "substrate" refers to the growing medium in which the plant develops its roots.

According to an aspect of the invention, the coconut fiber acts as an essential support for the other components of the composition. In other words, compost of sheep manure and *Glomus iranicum* var. *tenuihypahrum* are dispersed among the coconut fibers.

Coconut fiber is a per se known material, which is generally used in hydroponic cultivation. According to this practice, the plant is irrigated with a nutritive solution composed of water and of the compounds (mostly inorganic) necessary to make all the elements necessary for normal mineral nutrition.

An advantage of using coconut fiber is given by its good oxygenation and water retention capabilities.

According to embodiments of the invention, the coconut fibers in the composition are loose, i.e., not compacted fibers.

According to additional embodiments of the present invention, coconut fibers have a length comprised between 8 mm and 12 mm, with 25% long fibers.

As above mentioned, coconut fiber is a commercially available product that is, per se, known in the art.

As an example, the currently commercially available product "Extra fibra de coco", produced by Sustratos del Sureste S.L.L. is suitable to be used in the composition of the invention.

The second essential component of the composition is a compost of sheep manure.

The compost of sheep manure in this case, is useful in the process of mineralization, with better nutritional characteristics with a balanced balance of NPK, including Calcium and microelements, apart from the bacterial load that helps root formation.

In the tests carried out in nurseries and ornamentals that are more sensitive in the transplanting season, it gives a better yield, because those plants are very sensitive to the accumulation of nutritive elements and especially saline.

It also helps to cushion the saline effect of irrigation water, especially sodium, boron and chlorine, very present these days in the well and desalination waters.

Sheep manure contains organic matter, mostly derived from animal (sheep) feces. Sheep manure is a solid, substantially organic, matter. Surprisingly, it has been observed that, using sheep manure compost in the composition of the invention, a particularly high fertilizing effect is obtained. Without being bound to a specific scientific explanation, it can be hypothesized that sheep manure contains a particularly high amount of both phosphorus and potassium as well as a low amount of nitrogen, compared to other animal's manures. Advantageously, sheep manure compost is substantially free from, or includes negligible amounts of bacteria, that can be potentially dangerous for plant growth, parasites and other pathogens.

As used herein, the term "compost" refers to a mixture of humidified substances deriving from plants or animals and degraded by bacteria and fungi. Compost may be obtained through a composting process, which may be defined as a process of recycling various organic materials regarded as waste products, in order to produce a soil conditioner, i.e., compost.

As above mentioned, it was observed that, advantageously, the compost of sheep manure contains considerable amounts of nutrients, low nitrogen content and high levels of phosphorus and potassium, which allows a particularly effective for plant growth.

Sheep manure compost is a commercially available product that is, per se, known in the art.

As an example of compost of sheep manure, the currently commercially available product "Natupost", produced by Abonos Organicos Pedrin, is suitable to be used in the composition of the invention.

Besides, the composition object of invention comprises *Glomus iranicum* var. *tenuihypharum* as additional essential component.

*Glomus iranicum* var. *tenuihypharum* is an arbuscular mycorrhizal fungus that is known per se in the art. *Glomus iranicum* var. *tenuihypharum* was deposited on 19 Apr. 2013 at the international depositary authority Belgian Coordinated Collections of Micro-Organisms (BCCM) with the address at Université Catholique de Louvain, Mycothèque de l'Université catholique de Louvain (MUCL), Croix du Sud 2, Box L7.05.06, 1348 Louvain-la-Neuve, by Symborg, S. L. Advantageously, it has been observed that the use of *Glomus iranicum* var. *tenuihypharum* in the composition of the invention, allows for a fast and effective increase in the root development. Without being bound to a specific scientific explanation, it has been hypothesized that the use of *Glomus iranicum* var. *tenuihypharum* in the composition of the invention allows for an increase in the root exploration surface and enhances nutrient (such as nitrogen and phosphorus) absorption in the plant roots.

This effect is enhanced, according to the invention, by the combination of *Glomus iranicum* var. *tenuihypharum* with the other to essential components of the composition according to the present invention, i.e. coconut fiber and sheep manure.

As above mentioned, *Glomus iranicum* var. *tenuihypharum* is known per se in the art, and it is currently commercially available.

As an example, the currently commercially available product "Resid MG", produced by Symborg, which is a solid material in microgranulated form which includes *Glomus iranicum* var. *tenuihypharum*, can be advantageously used in the composition of the invention.

The composition of the invention, which comprises coconut fibers, compost of sheep manure and *Glomus iranicum* var. *tenuihypahrum* favors a fast root development of a plant.

Also, advantageously, the use of the composition of the invention allows avoiding or reducing the use of additional nutrients, at least in the first phases of the cultivation.

According to the invention, the composition includes coconut fiber in an amount in the range from 70% to 90% by weight, preferably from 75% to 85% by weight, more preferably 75% by weight of the final composition weight.

According to another embodiment, the composition of the invention includes sheep manure compost in an amount in the range from 10% to 30% by weight, preferably from 15% to 25% by weight, more preferably 25% by weight of the final composition weight.

According to additional embodiments, in the composition of the invention *Glomus iranicum* var. *tenuihypahrum* is present in an amount of 0.0025% by weight of the final composition weight.

According to embodiments, the composition of the invention may include about 75% by weight of coconut fiber, about 25% by weight of compost of sheep manure and 0.0025% by weight of *Glomus iranicum* var. *tenuihypahrum*.

For example, the composition of the invention may include about 80% by weight of coconut fibers, about 20% by weight of compost of sheep manure and 0.002% by weight of *Glomus iranicum* var. *tenuihypahrum*.

The composition of the invention may be produced by admixing the components, according to techniques that are, per se, known in the art.

For example, in order to obtain the composition of the invention, the coconut fiber is firstly hydrated and homogenized (e.g., by means of a screw). The coconut fiber is loosened and slightly moistened, and mixed in the proportional dose, applying the recommended amount for each m³ of the substrate, then the mixture is uniformized in a 12 m long worm so that all the substrate is left with the same proportion. Subsequently, the coconut fiber is mixed with compost of sheep manure and *Glomus iranicum* var. *tenuihypharum* (e.g., in the form of microgranules including the *Glomus*). Upon obtainment of a substantially homogeneous mixture, the composition is packaged.

Preferably, the composition of the invention is packaged into a bag, as it will be explained in greater detail below.

As above mentioned, the composition of the invention is preferably packaged into a bag.

Further object of the present invention is thus a bag containing the composition of the invention. In particular, said bag contains a composition comprising coconut fibers, compost of sheep manure and *Glomus iranicum* var. *tenuihypahrum*.

As above mentioned, the composition of the invention, advantageously, provides for the fast root development of a plant.

This is particularly true when the plant is cultured within the bag containing the composition of the invention.

For example, the bag may contain about 10 kg of composition of the invention. For example, about 10 kg of composition of the invention may include about 7.5 kg of coconut fibers (e.g., about 7.5 kg of "Extra fibra de coco"), about 2.5 kg of sheep manure compost (e.g., about 2.5 kg of "Natupost") and about 0.025 kg (i.e., about 25 g) of a currently commercially available composition comprising *Glomus iranicum* var. *tenuihypharum* (e.g., about 25 g of "Resid MG").

An exemplary embodiment of the bag of the present invention is schematically represented in FIG. 1.

FIG. 1 shows a bag 1, according to the present invention.

According to a particular embodiment of the present invention, the bag 1 has at least a first weakened portion 4, which allows the opening of the bag 1. The weakened portion 4 has preferably a mechanical resistance that is lower than the other portion of the bag 1.

According to embodiments, the weakened portion 4 divides the bag 1 into two parts 1a, which are, preferably, equal, by running around the whole perimeter of the bag 1. In other words, two parts 1a of the bag 1 are joined together by the weakened portion 4, so that, advantageously, user's intervention may cause the separation of the two parts 1a, to obtain two independent parts 1a of the bag, Each part 1a obtained from the bag 1 contains the composition of the invention and has an opening through which the composition in the bag part 1a can be contacted.

For example, the weakened portion 4 may be a pre-cut.

In the embodiment of FIG. 1, the weakened portion 4 is a pre-cut, located in the central portion of the bag 1.

The bag 1 may be made of known materials. Preferably, the bag 1 comprises at least in part one or more plastic materials.

Advantageously, in FIG. 1, the bag 1, which has a pre-cut 4 in its central portion, is particularly easy to handle, and can be opened in a quick and simple manner. In fact, the central weakened portion (e.g., a pre-cut) 4 allows for the opening of the bag 1, and the division of the bag 1 into two bag parts 1a, substantially avoiding the use of specific working tools. In fact, advantageously, the two parts 1a of the bag 1 may be separated by acting on the weakened portion 4 with hands and/or simple tools, such as, for example, scissors or a knife.

Figure 2:
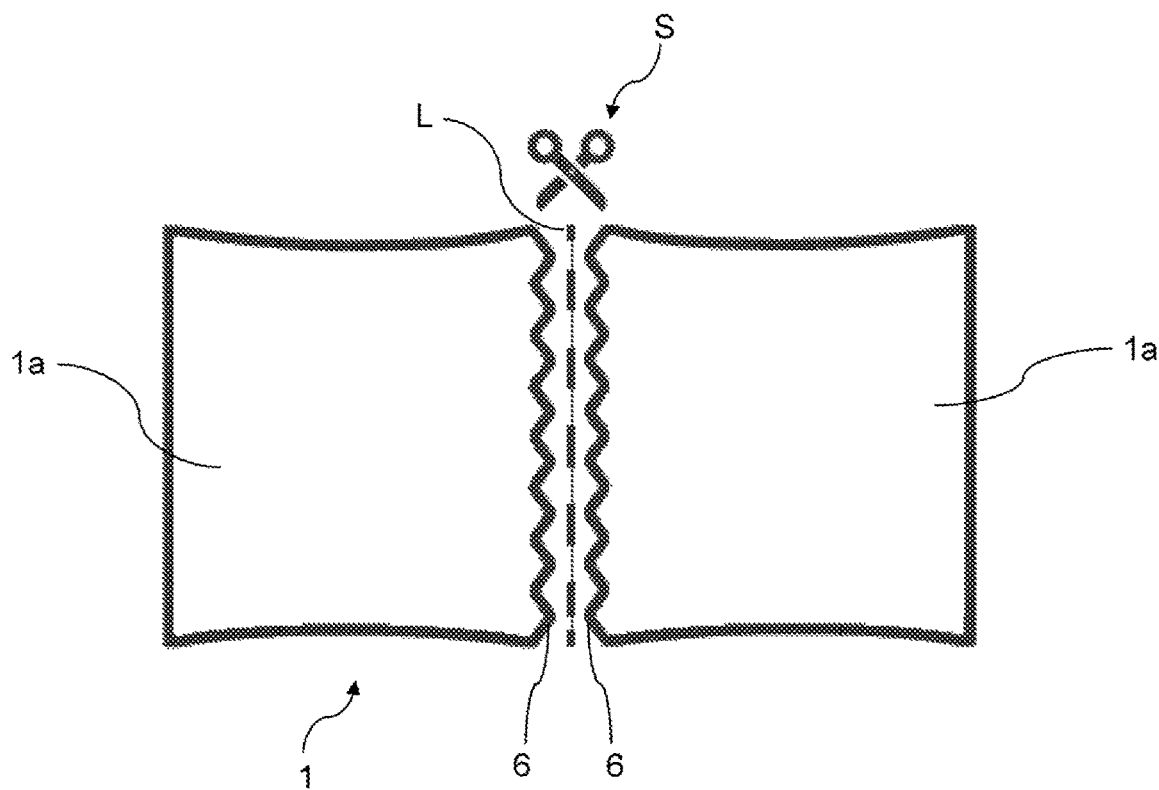
FIG. 2 is a schematic representation of the process for obtaining two independent bag parts from the bag of the invention.

FIG. 2 is a schematic representation of the process for obtaining two independent bag parts 1a from the bag 1 of the invention. In the exemplary embodiment of FIG. 2, the bag 1 is cut along the weakened portion 4 (not shown in FIG. 2) by using scissors S. In this way, according to FIG. 2, the bag 1 is divided into two independent parts 1a, which are, preferably equal, and have each one a first opening 6. According to an advantageous aspect of the present invention, each one of the bag parts 1a contains the composition of the invention.

In FIG. 2, the dashed line L indicates in which direction the bag 1 is cut, i.e., along the weakened portion 4, not shown in FIG. 2.

As above mentioned, an object of the present invention is a bag 1 containing the composition of the invention.

Advantageously, the bag 1 comprises the composition of the invention, which allows for fast root development of a plant.

Advantageously, a plant may be cultured directly in the composition of the invention, preferably directly within the bag 1, i.e., within at least one of the two bag parts 1a obtainable from the bag 1.

Also advantageously, the bag 1 according to the invention provides for at least two independent bag parts 1a, so that one bag 1 may be used for culturing, for example, two plants, i.e., one plant for each one of the two bag parts 1a.

Also, since the bag 1 already contains the composition of the invention, it is not necessary to open the bag 1 to fill it with soil and/or other cultivation substrates thus reducing additional working time.

Moreover, when a plant is cultured directly within the bag 1, i.e., within at least one of the two bag parts 1a obtainable from the bag 1, the application of additional fertilizers may be substantially reduced or avoided.

According to an aspect of the invention, when a plant is cultured within the bag 1, i.e., within at least one of the two bag parts 1a obtainable from the bag 1, root development is particularly fast and effective.

Also an object of the invention is a process for developing roots of a plant.

Figure 3:
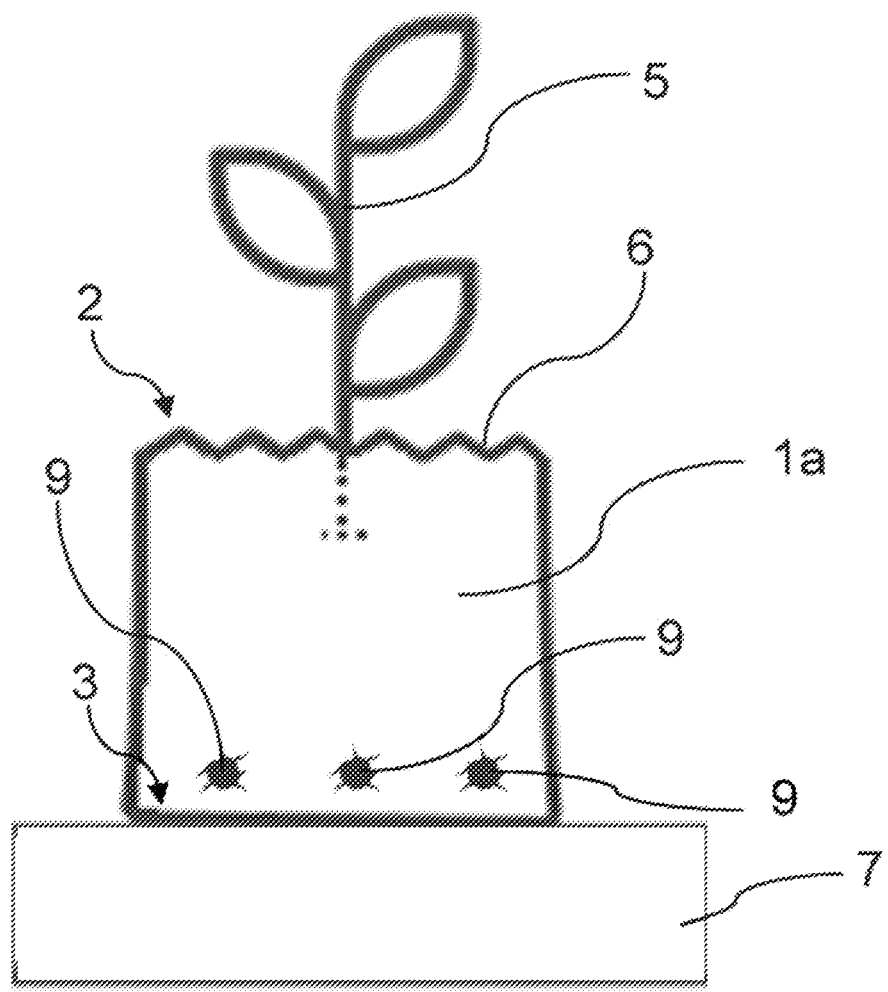
FIG. 3 is a schematic representation of an embodiment of the process of the invention, wherein the bag is placed on the soil surface.
Figure 4:
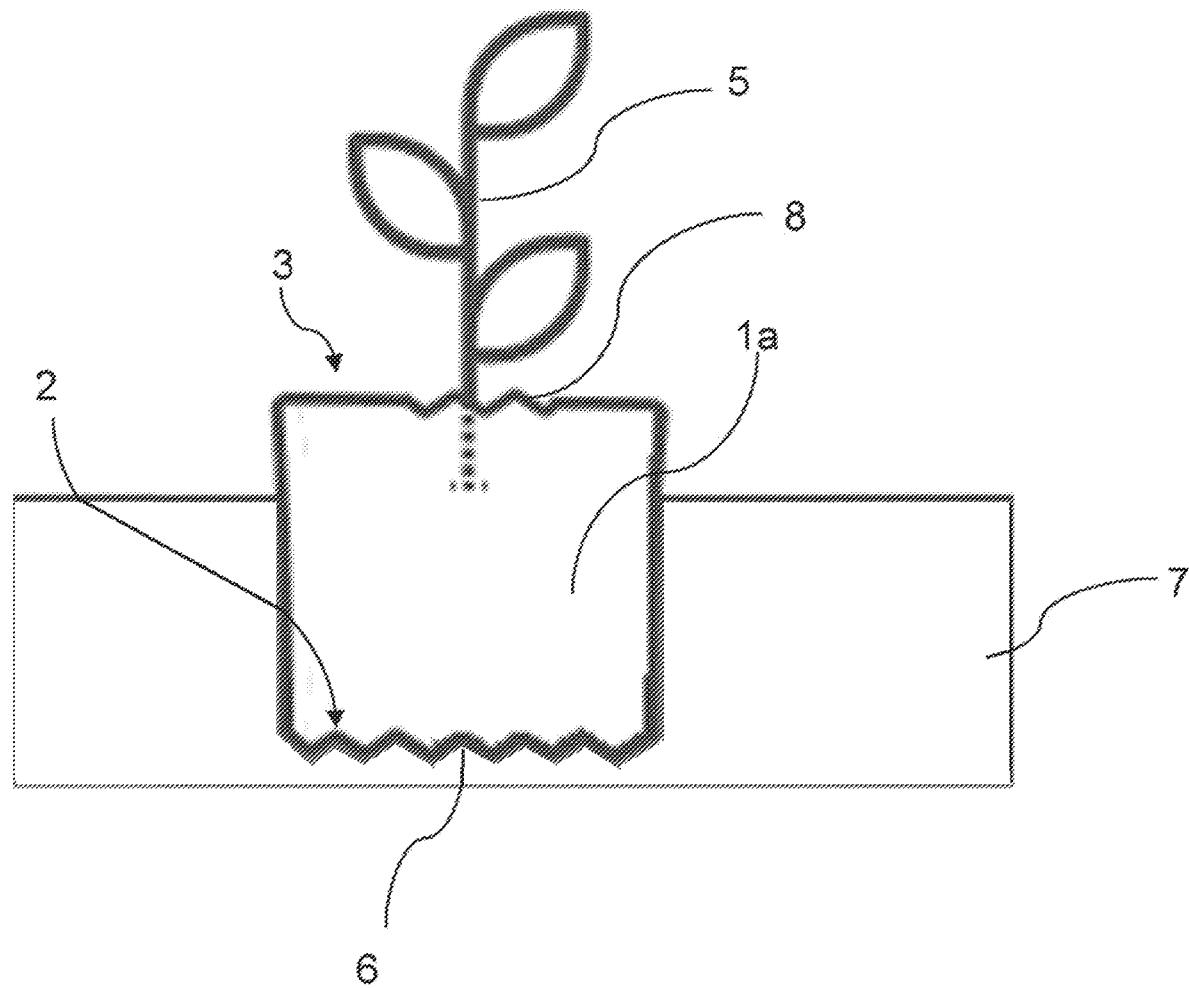
FIG. 4 is a schematic representation of the process of the invention, wherein the bag is partially inserted into the soil.

Embodiments of the process of the invention are schematically represented in FIGS. 3 and 4.

As above mentioned, object of the invention is a process for developing roots of a plant 5, comprising the following steps, with specific reference to the present Figures:

a) providing a bag 1 comprising at least two parts 1a joined together through at least one weakened portion 4, the bag 1 including the composition according to the invention;

b) Applying a force to the at least one weakened portion 4, to separate the at least two parts 1a of the bag 1, to obtain two independent bag parts 1a, each one having a first opening 6, wherein the composition contained in the bag parts 1a is accessible;

c) Contacting said composition with a plant 5 or at least a seed.

d) Culturing said plant or seed.

Advantageously, two independent bag parts 1a may be obtained by acting on the weakened portion 4 of the bag 1, i.e., by applying a force to tear or cut the wakened portion 4 of the bag 1. For example, when the bag 1 comprises a pre-cut as the weakened portion 4, two independent bag parts 1a may be obtained by tearing or cutting the pre-cut. In this way, advantageously, the bag 1 may be opened and divided into two independent bag parts 1a, in a fast and easy way, substantially avoiding the use of working tools.

Advantageously, each one of the bag parts 1a has a first opening 6, which is obtained by separating the two bag parts 1a along the weakened portion 4 of the bag 1. Once two independent bag parts 1a are obtained, the composition contained in each bag part 1a may be contacted with a plant 5 or at least a seed, through the first opening 6.

According to FIG. 3 and according to the invention, at least one the bag parts 1a may be placed on the surface of the soil 7. In this case, advantageously, the bag part 1a may be used as a pot for the culturing of plants.

For example, according to FIGS. 1, 2 and 3, the first opening 6 may be provided in a first portion 2 of the bag part 1a, and the bag part 1a may contact the soil with its second portion 3, which is opposite to the first portion 2, i.e., opposite to the first opening 6.

According to the embodiment represented in FIG. 3, the composition of the invention, which is contained in the bag part 1a, does not directly contact the soil 7.

A plant 5 or at least a seed contacts the composition contained in the bag 1 through the first opening 6, and then is cultured according to known methods. Optionally, one or more holes 9 may be provided to the bag part 1a, preferably in the portion of the bag part 1 which is close to the soil 7, to drain possible water excess.

After that plant has sufficiently grown, the plant 5 may be extracted from the bag part 1a and transplanted into the soil 7.

According to other embodiments, advantageously, at least one of the bag parts 1a may be inserted, completely or partially, into the soil 7.

Thus, the process of the invention may further comprise a step c') of contacting the soil 7 with the composition of the invention.

According to embodiments, the composition of the invention contained in the bag part 1a may contact the soil 7 through the first opening 6.

In this case, the bag part 1a may be provided with a second opening 8, through which the composition contained in the bag part 1a may be contacted.

According to embodiments, the bag part 1a is provided with a first opening 6 in its first portion 2 and provided with a second opening in its second portion 3, which is opposite to the first portion 2, so that the second opening 8 is opposite to the first opening 6.

According to this specific embodiment, the composition of the invention may be contacted with a plant 5 or at least a seed through the second opening 8, while the contact of the composition with soil 7 is obtained through the first opening 6.

FIG. 4, shows an embodiment of the invention wherein the bag part 1a is partially inserted into the soil 7.

According to FIG. 4, the bag part 1a is provided with a first opening 6 in its first portion 2. The bag part 1a is provided with a second opening 8 in its second portion 3, opposite to the first portion 2. A plant 5 is inserted within the bag part 1a through the second opening 8, to contact the composition contained in the bag part 1a.

Advantageously, as above mentioned, by separating the two bag parts 1a of the bag 1, along the weakened portion 4 of the bag 1, two independent bag parts 1a may be obtained, wherein each one of the two bag parts 1a has a first opening 6.

Once two independent bag parts 1a are obtained, at least of the bag parts 1a may be positioned so that the composition contained in the bag part 1a contacts the soil 7, preferably within a planting hole in the soil, through the first opening 6.

For example, the open bag part 1a may be at least in part inserted into a planting hole in the soil 7 so that the composition contained in the bag 1 can contact the soil 7, e.g. through the first opening 6.

Subsequently, the bag part 1a may be provided with a second opening 8, opposite to the first opening 6, so that composition contained in the bag part 1a may be contacted with a plant 5 or at least a seed, through the second opening 8. The second opening 8 in the bag part 1a may be provided through known methods.

The second opening 8 may be opened in the second portion 3 of the bag part 1a in order to insert a plant 5 or at least a seed to be cultured into the bag part 1a, to contact the composition contained therein, which, advantageously, provided for a fast and effective root development.

For example, bag 1 may be divided into two independent bag parts 1a by tearing the pre-cut 4 (not shown in FIGS. 3 and 4) e.g., provided in central portion of the bag 1.

According to FIG. 4, the first portion 2 of the bag part 1a, which is provided with the first opening 6 (obtained by tearing the pre-cut 4 of the bag 1), is inserted into the soil 7, so that the first opening 6 can contact the soil 7, to allow the direct contact between the composition contained in the bag part 1a and the soil 7.

Advantageously, a plant 5, which contacts the composition in the bag part 1a through the second opening 8, while the composition in the bag part 1a contacts the soil through the first opening 6, which preferably inserted into the soil, may be cultured through known methods.

After that plant has sufficiently grown, the bag part 1a may be removed from the soil. In this way, advantageously, the roots can spread into the soil after that the bag part 1a is removed.

Further object of invention is the use of the composition of the invention and/or a bag 1 comprising it, for root development of a plant.

The use of the bag 1, i.e., the use of at least one of the bag parts 1a obtainable from the bag 1, comprising the composition of the invention, as a pot, gives many advantages compared to the use of common nursery pots. Indeed, differently from currently available bags and nursery pots, the bag 1 (and, thus, the bag parts 1a obtainable therefrom) of the invention already contains the composition for stimulating root development in a plant. On the contrary, currently available bags and nursery pots have to be filled with different substances that have to be mixed together to obtain a suitable nutrient substrate. Therefore, the bag 1 containing the composition of the invention allows reducing time needed for roots development and the growing of a plant.

Also advantageously, it was observed that the bag comprising the composition according to the invention, allows a saving of water of 50% in the first phases of cultivation, i.e., 8-10 weeks from planting. After a first phase of cultivation within the bag 1 of the invention, i.e., in at least one of the bag parts 1a obtainable from the bag 1, a plant may be extracted and transplanted into another substrate, e.g., directly into the soil, as above mentioned. In this case, after the extraction from the bag part 1a, advantageously, it has been observed that 25% saving in water and nutrient consumption may be obtained in the first year of cultivation, obtaining a plant with numerous and healthy roots, in a reduced amount of time with respect to the times required with the known compositions and cultivation techniques.

Moreover, advantageously, it was observed that the process according to the present invention allows an increase in plant production in the first harvest, ranging from 20% to 50% with respect to known compositions and cultivation techniques, depending on the soil's condition.

EXPERIMENTAL SECTION

Tests have been carried out wherein table grapes has been cultivated within the bag comprising the composition of the invention.

Tests concerning the composition of the invention in the bag of the invention were carried out according to the embodiment of FIG. 4.

Control tests were also carried out, by culturing plants directly into the soil.

Two tests concerning the composition of the invention in the bag of the invention ("Test 2" and "Test 4"), as well as two control tests ("Test 1" and "Test 3") were carried out.

"Test 1" (control) and "Test 2" (according to the invention), were carried out using soil and irrigation water in good conditions.

"Test 3" (control) and "Test 4" (according to the invention), were carried out using soil and irrigation water in poor conditions.

With reference to the soil's conditions and the irrigation water's conditions, the terms "good conditions" and "poor conditions" are defined as follows:

Ground Conditions:

"Good conditions": Good soil conditions, land with good content in organic matter, generally equal to or above 3%.

With physical conditions, sandy loam, with good aeration.

Rested from previous crops, or with other crops have not been previously vineyards.

"Poor conditions": Bad soil conditions (Murcia area), organic matter content less than 1%, high content of active limestone, high content of salts.

Physical Conditions, clay loam texture, with high compactness and lack of aeration.

Conditions of Irrigation Water:

"Good conditions": Good quality irrigation water, electrical conductivity of water, between 1 and about 2 dS/m. Good balance between cations and anions, low in sodium, chlorine and boron. Irrigation water in "good condition" may derive from river water, and good quality wells.

"Poor conditions": Bad quality of irrigation water, (Murcia area). Electrical conductivity of water between more than 2 and 4.5 dS/m. De-balance between cations and anions, with a predominance of salts that may be harmful to plants, especially in their initial state. High content in sodium, chlorine and boron. Water deriving from desalination plants, and/or poor quality wells.

After 18 months of planting, first harvest was performed and plants' production results were determined. Subsequently, a second harvest was performed and plants' production results were determined.

The following results were obtained.

Example 1—Soil and Irrigation Water in Good Conditions

The soil used was in good condition, as above defined, i.e., fertile.

Electrical conductivity of irrigation water used was between about 1 and about 2 dS/m.

TABLE 1

|  | Test 1 Soil | Test 2 Bag according to the invention |
|---|---|---|
| Formation cost (€/ha) | 10869 | 8600 |
| Plants formed successfully (%) | 85.5 | 100 |
| First harvest production (Kg/ha) | 10470 | 16320 |
| Second harvest production (Kg/ha) | 22710 | 28560 |

Example 2—Soil and Irrigation Water in Poor Conditions

The soil used was in poor condition, as above defined, with a high content of salts. Electrical conductivity of irrigation water used was between about 2.5 and about 4.5 dS/m.

TABLE 2

|  | Test 3 Soil | Test 4 Bag according to the invention |
|---|---|---|
| Formation cost (€/ha) | 14396 | 9300 |
| Plants formed successfully (%) | 60 | 100 |
| First harvest production (Kg/ha) | 4860 | 12240 |
| Second harvest production (Kg/ha) | 15170 | 24480 |

As can be observed from Table 1 and Table 2, the present invention provides for an increase in the percentage of plants formed successfully, and in the production yield, both at the first and the second harvest. This increase occurred using soil and irrigation water in good conditions, as well as in poor conditions.

Additionally, the present invention allows for a reduction of the plant production process costs in all the conditions tested.

The invention claimed is:

1. A composition containing, as essential components, coconut fibers, compost of sheep manure and *Glomus iranicum* var. *tenuihypahrum*.

2. The composition according to claim 1, wherein said coconut fiber is in an amount in the range from 70% to 90% by weight of the final composition weight.

3. The composition according to claim 2, wherein said coconut fiber is in an amount of 75% by weight of the final composition weight.

4. The composition according to claim 1, wherein said sheep manure compost is in an amount in the range from 10% to 30% by weight of the final composition weight.

5. The composition according to claim 4, wherein said sheep manure compost is in an amount of 25% by weight of the final composition weight.

6. The composition according to claim 1, wherein *Glomus iranicum* var. *tenuihypahrum* is in an amount in the range from 0.0005% to 0.005% by weight of the final composition weight.

7. The composition according to claim 6, wherein said *Glomus iranicum* var. *tenuihypahrum* is in an amount of 0.0025% by weight of the final composition weight.

8. A bag comprising the composition according to claim 1.

9. The bag according to claim 8, comprising at least two parts joined together through at least a first weakened portion.

10. A process for developing roots of a plant, comprising the following steps:
    a) providing a bag comprising at least two parts joined together through at least one weakened portion, said bag including the composition according to claim 1;
    b) applying a force to said at least one weakened portion, to separate said at least two parts of said bag, to obtain two independent bag parts each one having a first opening, wherein said composition contained in said bag parts is accessible;
    c) contacting said composition with a plant or at least a seed; and
    d) culturing said plant or seed.

11. The process according to claim 10, wherein said at least two independent bag parts are obtained by acting on said first weakened portion of said bag.

12. The process according to claim 10, wherein said composition contained in at least one of said bag parts is contacted with a plant or at least a seed through said first opening.

13. The process according to claim 10, further comprising a step c') of contacting soil with said composition.

14. The process according to claim 13, wherein said composition contained in at least one of said bag parts contacts the soil through said first opening.

15. The process according to claim 14, wherein said composition contacts a plant or at least a seed through a second opening.

16. The composition according to claim 1, wherein said coconut fiber is in an amount in the range from 75% to 85% by weight of the final composition weight.

17. The composition according to claim 1, wherein said coconut fiber is in an amount in the range from 77.5% to 82.5% by weight of the final composition weight.

18. The composition according to claim 1, wherein said sheep manure compost is in an amount in the range from 15% to 25% by weight of the final composition weight.

19. The composition according to claim 1, wherein *Glomus iranicum* var. *tenuihypahrum* is in an amount in the range from 0.001% to 0.003% by weight of the final composition weight.

20. The composition according to claim 1, wherein *Glomus iranicum* var. *tenuihypahrum* is in an amount in the range from 0.0015% to 0.0025% by weight of the final composition weight.

* * * * *